(12) United States Patent
Shindo et al.

(10) Patent No.: US 7,661,189 B2
(45) Date of Patent: Feb. 16, 2010

(54) APPARATUS FOR ADJUSTING STATIC ATTITUDE OF THIN FILM MAGNETIC HEAD

(75) Inventors: Osamu Shindo, Tokyo (JP); Toru Mizuno, Tokyo (JP); Takao Torii, Tokyo (JP)

(73) Assignee: TDK Corporation, Tokyo (JP)

( * ) Notice: Subject to any disclaimer, the term of this patent is extended or adjusted under 35 U.S.C. 154(b) by 412 days.

(21) Appl. No.: 11/520,685

(22) Filed: Sep. 14, 2006

(65) Prior Publication Data

US 2007/0064333 A1 Mar. 22, 2007

(30) Foreign Application Priority Data

Sep. 15, 2005 (JP) ............... 2005-268444

(51) Int. Cl.
- *B23P 19/00* (2006.01)
- *G11C 5/12* (2006.01)
- *H01M 10/14* (2006.01)

(52) U.S. Cl. ............... 29/737; 29/603.07; 29/603.09; 29/729; 360/66; 360/75; 360/78.06; 360/78.08; 360/264.2

(58) Field of Classification Search ............... 29/603.09, 29/729, 737, 742, 833; 360/66, 75, 78.06, 360/78.08, 264.2, 266.3, 244.1
See application file for complete search history.

(56) References Cited

U.S. PATENT DOCUMENTS 5,832,764 A 11/1998 Girard
6,011,239 A 1/2000 Singh et al.
7,069,156 B2 * 6/2006 Zeng ............... 702/43

FOREIGN PATENT DOCUMENTS

| CN | 1336664 | | 2/2002 |
|---|---|---|---|
| JP | 04265807 A | * | 9/1992 |
| JP | 2000-339894 | | 12/2000 |
| JP | 2001-357644 | | 12/2001 |
| JP | 2001-357645 | | 12/2001 |
| JP | 2001-357646 | | 12/2001 |
| JP | 2002-74630 | | 3/2002 |
| JP | 2002-313041 | | 10/2002 |
| JP | 2005-222621 | | 8/2005 |

\* cited by examiner

*Primary Examiner*—Paul D Kim
(74) *Attorney, Agent, or Firm*—Oblon, Spivak, McClelland, Maier & Neustadt, L.L.P.

(57) ABSTRACT

Provided is an apparatus for adjusting static attitude of a thin film magnetic head attached to a flexure of a head arm assembly. The apparatus has an adjusting unit for bending the flexure, a laser emitter unit for irradiating a laser beam to a bent area of the flexure a measuring unit for measuring a static attitude angle of the thin film magnetic head, and a computer system including a CPU and a memory unit in which adjustment conditions corresponding to static attitude angles of the thin film magnetic head are previously ranked and memorized. The CPU is configured to retrieve from the memory unit a particular adjustment condition corresponding to a measured angle supplied from the measuring unit and supply the retrieved adjustment condition to the adjusting unit, enabling the adjusting unit to bend the flexure based on the retrieved adjustment condition supplied from the computer system.

5 Claims, 9 Drawing Sheets

APPARATUS FOR ADJUSTING STATIC ATTITUDE OF THIN FILM MAGNETIC HEAD

BACKGROUND OF THE INVENTION

1. Field of the Invention

The present invention relates to a method and apparatus for adjusting static attitude of a thin film magnetic head.

2. Description of the Related Art

It is an essential requirement of a floating-type magnetic head unit to hold at a higher accuracy the static attitude of a magnetic head supported with a head support for achieving high density recording and reproducing. The static attitude angles of the magnetic head unit include a pitch angle and a roll angle.

However, the magnetic head unit is generally configured to have the magnetic head bonded to one end of the head support (or suspension) through an adhesive, which may cause displacement from a desired static attitude.

Since the magnetic head unit is manufactured by mounting the magnetic head, which is an expensive component manufactured through elaborate processes, on the head support, which is also an expensive high-precision component, it is not permitted to discard the assembled magnetic head unit as a defective product merely on the grounds that the static attitude angle of the magnetic head does not fall within a given range.

In order to correct the displacement of the static attitude, there has been developed an adjusting means which applies a mechanical pressure with the use of a pressing jig. According to this static attitude adjusting method using the pressing jig, a flexure mounted on a free end side of a load beam is bent by pressure with one point of the flexure on the axis of the load beam taken as the fulcrum, thereby adjusting the static attitude of the magnetic head.

After being bent by the mechanical pressure, however, the flexure tends to be sprung back by its restoring force. This means that the flexure has to be bent more than necessary to merely attain the desired static attitude.

When the flexure is bent largely, a gap may be created between the flexure and a projection (or dimple) through which a load is applied from the load beam to the flexure, resulting in the occurrence of so-called dimple floating. The dimple floating inhibits the load beam from applying a load onto the flexure, thus deteriorating the floating characteristic of the magnetic head.

As a means for solving the above problem, Japanese Unexamined Patent Application Publication Nos. 2001-357644 & 2001-357645 disclose a technology of keeping the flexure or load beam bent at an angle close to the initial bending angle, wherein after the flexure or load beam is bent for static attitude adjustment, stress is relieved by irradiating a laser beam to the bent area.

This prior art technology has an excellent effect that a significant change in static attitude can be obtained from bending the head support at a small angle.

SUMMARY OF THE INVENTION

It is an object of the present invention to provide an improved method and apparatus for adjusting static attitude of a magnetic head, wherein operation of obtaining a significant change in static attitude from bending a flexure at a small angle can be executed automatically.

In order to achieve the above object, the present invention provides a method for adjusting static attitude of a thin film magnetic head attached to a flexure of a head arm assembly, comprising:

previously ranking and memorizing adjustment conditions corresponding to static attitude angles of the thin film magnetic head;

measuring a static attitude angle of the thin film magnetic head;

bending the flexure for static attitude adjustment based on a particular adjustment condition corresponding to a measured angle; and irradiating a laser beam to a bent area of the flexure.

When a flexure is bent for static attitude adjustment, a stress corresponding to the bending is generated in the flexure. According to the present invention, a laser beam is irradiated to a bent area of the flexure. In the laser-irradiated bent area, consequently, the stress can be relieved by heat due to the irradiation of the laser beam. As a result, the restoring effect of the flexure decreases in the laser-irradiated area, keeping the flexure bent at an angle close to the initial bending angle. This means that the flexure can be kept at a desired bending angle even if the initial bending angle is small. Therefore, a significant change in static attitude can be obtained from bending the flexure at a small angle.

These basic steps are disclosed in the above Patent Publications. The present invention is characterized by including a step of automatically executing these basic steps. That is, adjustment conditions corresponding to static attitude angles of the thin film magnetic head are previously ranked and memorized. Thereafter, the thin film magnetic head is measured for static attitude angle, the flexure is bent for static attitude adjustment based on a particular adjustment condition corresponding to a measured angle, and a laser beam is irradiated to a bent area of the flexure.

This additional step enables automatic adjustment of the static attitude of the thin film magnetic head with a high degree of repeatability. A system mainly of a CPU (or computer) may be constructed for adjusting the static attitude of the thin film magnetic head.

The above static attitude adjusting method may be performed using an apparatus according to another aspect of the present invention. This apparatus comprises:

an adjusting unit for bending the flexure;

a laser emitter unit for irradiating a laser beam to a bent area of the flexure;

a measuring unit for measuring a static attitude angle of the thin film magnetic head; and a computer system including a CPU and a memory unit in which adjustment conditions corresponding to static attitude angles of the thin film magnetic head are previously ranked and memorized, wherein the CPU is configured to retrieve from the memory unit a particular adjustment condition corresponding to a measured angle supplied from the measuring unit and supply the retrieved adjustment condition to the adjusting unit, enabling the adjusting unit to bend the flexure based on the retrieved adjustment condition supplied from the computer system.

It is apparent that this static attitude adjusting apparatus, which provides a static attitude adjusting system mainly of a CPU, enables automatic adjustment of the static attitude of the thin film magnetic head with a high degree of repeatability.

More specifically, the adjusting unit may include a plurality of movable adjustment pins whose distal ends are positioned to be able to be pressed against surfaces of the flexure.

In this case, the adjustment conditions may include contact positions and thrust distances of the adjustment pins against the flexure and laser irradiation positions on the flexure. The adjustment conditions may further include laser irradiation times.

Preferably, the adjustment pins are disposed at a given angle with respect to the surfaces of the flexure. With this configuration, mutual interference, e.g., contact or overlap of the adjustment pins, can be avoided even if the thin film magnetic head and the flexure are miniaturized.

For the measuring unit, there may be employed a CCD camera or a laser autocollimator. From the standpoint of quantification of measured angles, the laser autocollimator is desirable.

As has been described hereinabove, the present invention provides a method and apparatus for adjusting static attitude of a magnetic head, wherein operation of obtaining a significant change in static attitude from bending a flexure at a small angle can be executed automatically.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
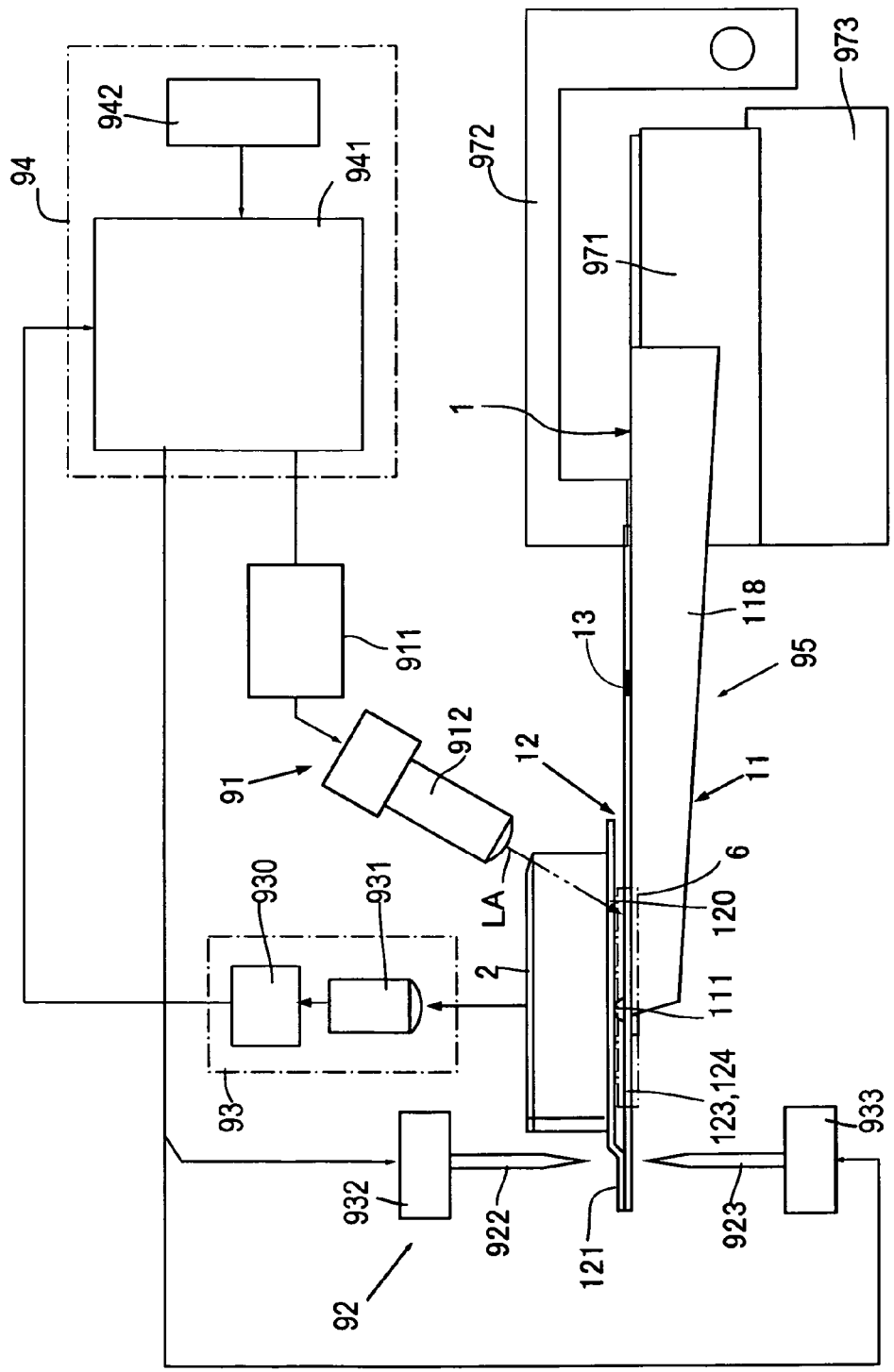
FIG. 1 is a diagram showing configuration of a static attitude adjusting apparatus employed for performing a static attitude adjusting method according to one embodiment of the present invention.
Figure 2:
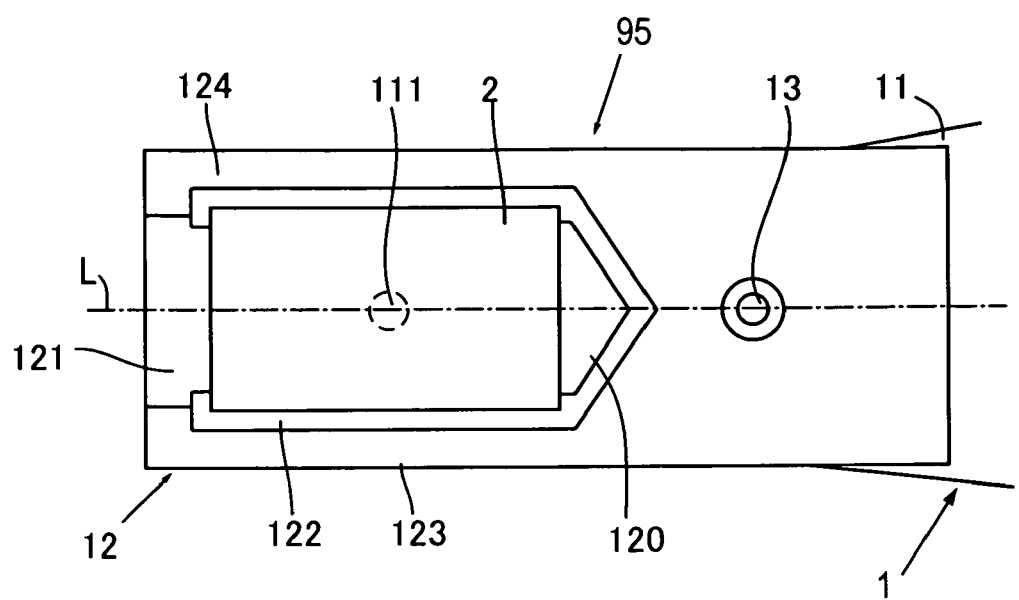
FIG. 2 is a bottom plan view of a magnetic head unit to be adjusted by a static attitude adjusting method according to one embodiment of the present invention.

Referring to FIG. 1, a static attitude adjusting apparatus according to one embodiment of the present invention comprises a laser emitter unit 91, an adjusting unit 92, a measuring unit 93, and a computer system 94. The static attitude adjusting apparatus is configured to adjust the static attitude of a thin film magnetic head 2 of a magnetic head unit 95 shown in FIG. 2.

The magnetic head unit 95 comprises a head support (or head arm assembly) 1 and the magnetic head 2. The head support 1 comprises a load beam 11 and a flexure 12. The load beam 11 has a projection 111 located close to a free end thereof and on a longitudinal axis L thereof. At both lateral sides, the illustrated load beam 11 has two bent portions 118 to increase rigidity (see FIG. 1).

The flexure 12 is formed from a thin leaf spring and subjected to a pressing load from the projection 111 with one side of the flexure 12 attached to one side of the load beam 11 where the projection 111 is located. The magnetic head 2 is attached to the other side of the flexure 12. At a joint 13, the flexure 12 is secured to the projection 111 side of the load beam 11 by spot welding or the like. The spot welding may be replaced by swaging. The flexure 12 has a tongue portion 120 in the center thereof. At one end, the tongue portion 120 is bonded to a lateral frame portion 121 of the flexure 12. Both ends of the lateral frame portion 121 are connected to longitudinal frame portions 123, 124 of the flexure 12. A groove 122 is provided between the tongue portion 120 and the longitudinal frame portions 123, 124, extending around the tongue portion 120. The magnetic head 2 is bonded to one side of the tongue portion 120 through an adhesive or the like to be in spring contact with the projection 111.

A plurality of such magnetic head units 95 may be arranged at intervals on a workpiece pallet 971. Then, the magnetic head units (or workpieces) 95 and the workpiece pallet 971 may be mounted on a conveying jig 973 and held against the conveying jig 973 by a holding jig 972.

The static attitude adjusting apparatus illustrated in FIG. 1 is employed for adjusting the static attitude of the thin film magnetic head 2 of the above magnetic head unit. The static attitude angles include a pitch angle and a roll angle. The pitch angle refers to an angle between the magnetic head 2 and a reference line parallel to the longitudinal axis L of the load beam 11 (see FIG. 2); the roll angle refers to an angle about the longitudinal axis L. The static attitude angles may vary depending on the assembled position of the magnetic head 2 relative to the head support 1, the bending of the head support 1, and other conditions. According to the static attitude adjusting method and apparatus of the present invention, the static attitude can be reliably adjusted to desired angles.

The laser emitter unit 91 irradiates a laser beam LA to areas of the flexure 12 which are exposed externally on both sides of the magnetic head 2 and/or between the magnetic head 2 and the joint 13 where the flexure 12 is secured to the load beam 11. As the laser emitter unit 91, there may be employed a variety of types of lasers including a YAG laser. The illustrated laser emitter unit 91 comprises a laser oscillator 911 and a laser head 912. The laser head 912 is directed toward a bent area of the flexure 12.

Figure 3:
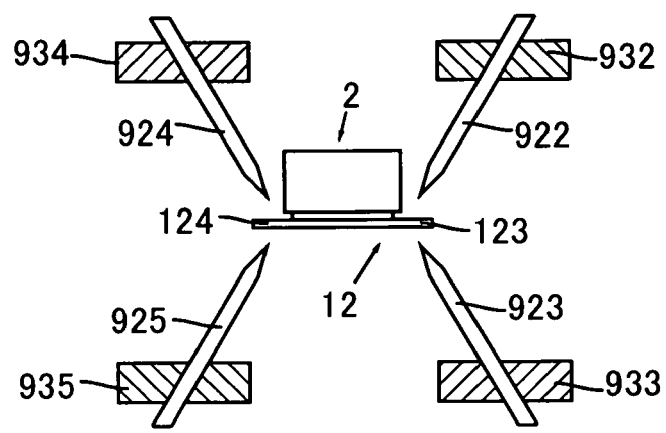
FIG. 3 is a diagram showing one embodiment of an adjusting unit.

The adjusting unit 92 bends the flexure 12 for static attitude adjustment. FIG. 3 is a diagram showing one embodiment of the adjusting unit 92. In this embodiment, the adjusting unit 92 has four adjustment pins 922 to 925 and four driving units 932 to 935. The adjustment pins 922 to 925 are movable pins which will be moved linearly by the driving units 932 to 935, respectively, with their distal ends positioned to be able to come into contact with the longitudinal frame portions 123, 124 of the flexure 12. The adjustment pins 922, 924 are located on one side of the flexure 12 (where the magnetic head 2 is attached), while the adjustment pins 923 and 925 are located on the other side of the flexure 12. In the illustrated embodiment, the adjustment pin 922 is opposed to the adjustment pin 923, and the adjustment pin 924 is opposed to the adjustment pin 925. However, the adjustment pins (922, 923 or 924, 925) of each pair may be arranged in different locations without being opposed to each other.

In the illustrated embodiment, the adjustment pins 922 to 925 are inclined to the surfaces of the flexure 12. With this configuration, mutual interference, e.g., contact of the opposite ends of the driving units 932, 934 supporting the adjacent adjustment pins 922, 924, can be avoided even if the thin film magnetic head 2 and the flexure 12 are miniaturized to have a significantly small plane area. This is true for the driving units 933, 935 supporting the adjacent adjustment pins 923, 925.

The measuring unit 93 detects the static attitude angles of the thin film magnetic head 2. For example, the measuring unit 93 may be directed toward an air bearing surface (hereinafter referred to as ABS) of the magnetic head 2. A detection signal produced by the measuring unit 93 is supplied to the computer system 94. The illustrated measuring unit 93 comprises a signal processor 932 and a detecting unit 931. The detecting unit 931 may comprise an angle detection means, such as a CCD or a laser autocollimator.

The computer system 94 comprises a CPU 941 and a memory unit (e.g., ROM) 942 in which adjustment conditions corresponding to static attitude angles of the thin film magnetic head 2 are previously ranked and memorized. The CPU 941 retrieves from the memory unit 942 particular adjustment conditions corresponding to measured angles supplied from the measuring unit 93 and supplies the retrieved adjustment conditions to the adjusting unit 92. The adjusting unit 92 bends the flexure 12 based on the adjustment conditions supplied from the computer system 94. The computer system 94 is a program execution unit composed of a CPU and a memory unit, including not only a personal computer and a microcomputer, but also a so-called sequencer unit.

Figure 4:
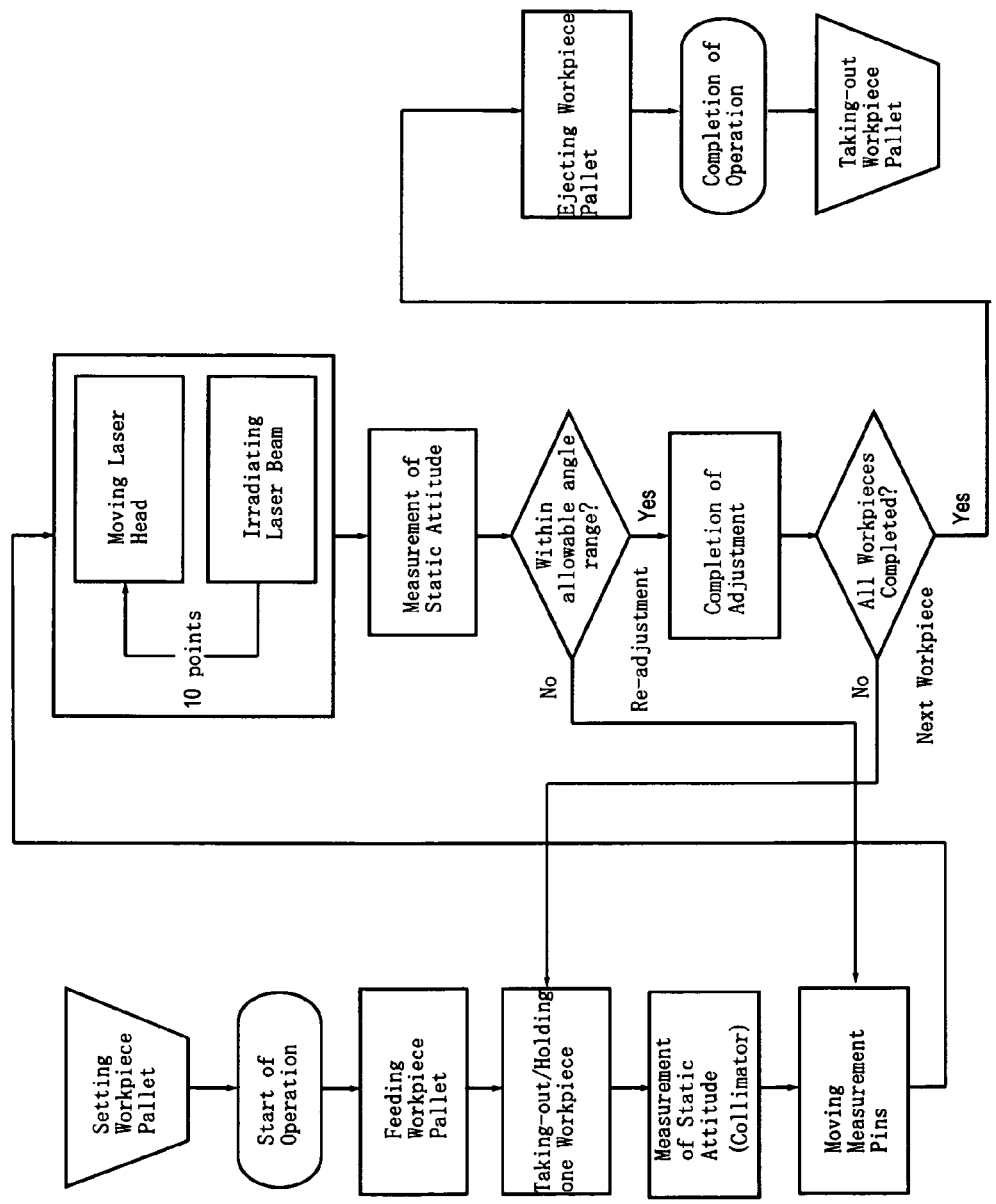
FIG. 4 is a flow chart of a static attitude adjusting method according to one embodiment of the present invention.

Next, the static attitude adjusting method according to one embodiment of the present invention will be described with reference to FIG. 4 along with the above drawings, particularly FIG. 1. FIG. 4 is a flow chart of the static attitude adjusting method according to one embodiment of the present invention.

At first, through the preparatory stages including setting of workpiece pallet, start of operation, feeding of workpiece pallet, and holding of workpiece, the magnetic head unit 95 and the workpiece pallet 971 are mounted on the conveying jig 973 and held against the conveying jig 973 by the holding jig 972, as shown in FIG. 1.

In this state, the static attitude angles of the thin film magnetic head 2 are detected by the measuring unit 93. More specifically, the static attitude angles are measured by irradiating a laser beam to the ABS of the thin film magnetic head 2 from the detecting unit 931 including a laser autocollimator or the like and receiving the reflected light.

The detection signal generated by the detecting unit 931 of the measuring unit 93 is supplied to the computer system 94 via the signal processor 932. The CPU 941 of the computer system 94 retrieves from the memory unit 942 particular adjustment conditions corresponding to measured angles supplied from the measuring unit 93 and supplies the retrieved adjustment conditions to the adjusting unit 92. The adjusting unit 92 is operated to move the adjustment pins 922 to 925 based on the adjustment conditions supplied from the computer system 94, thereby bending the flexure 12. The adjustment conditions include contact positions and thrust distances of the adjustment pins 922 to 925 against the flexure 12 and laser irradiation positions on the flexure 12. The adjustment conditions may further include laser irradiation times.

Setting of the adjustment conditions and controlling of movement of the adjustment pins by the computer system 94 will be described in detail hereinbelow.

As described above, the static attitude angles include the pitch and roll angles and may vary depending on the assembled position of the magnetic head 2 relative to the head support 1, the bending of the head support 1, and other conditions. Furthermore, the pitch and roll angles may take positive and negative values with the horizontal position as a reference value 0. Accordingly, the pitch and roll angles have to be adjusted positively or negatively.

Figure 5:
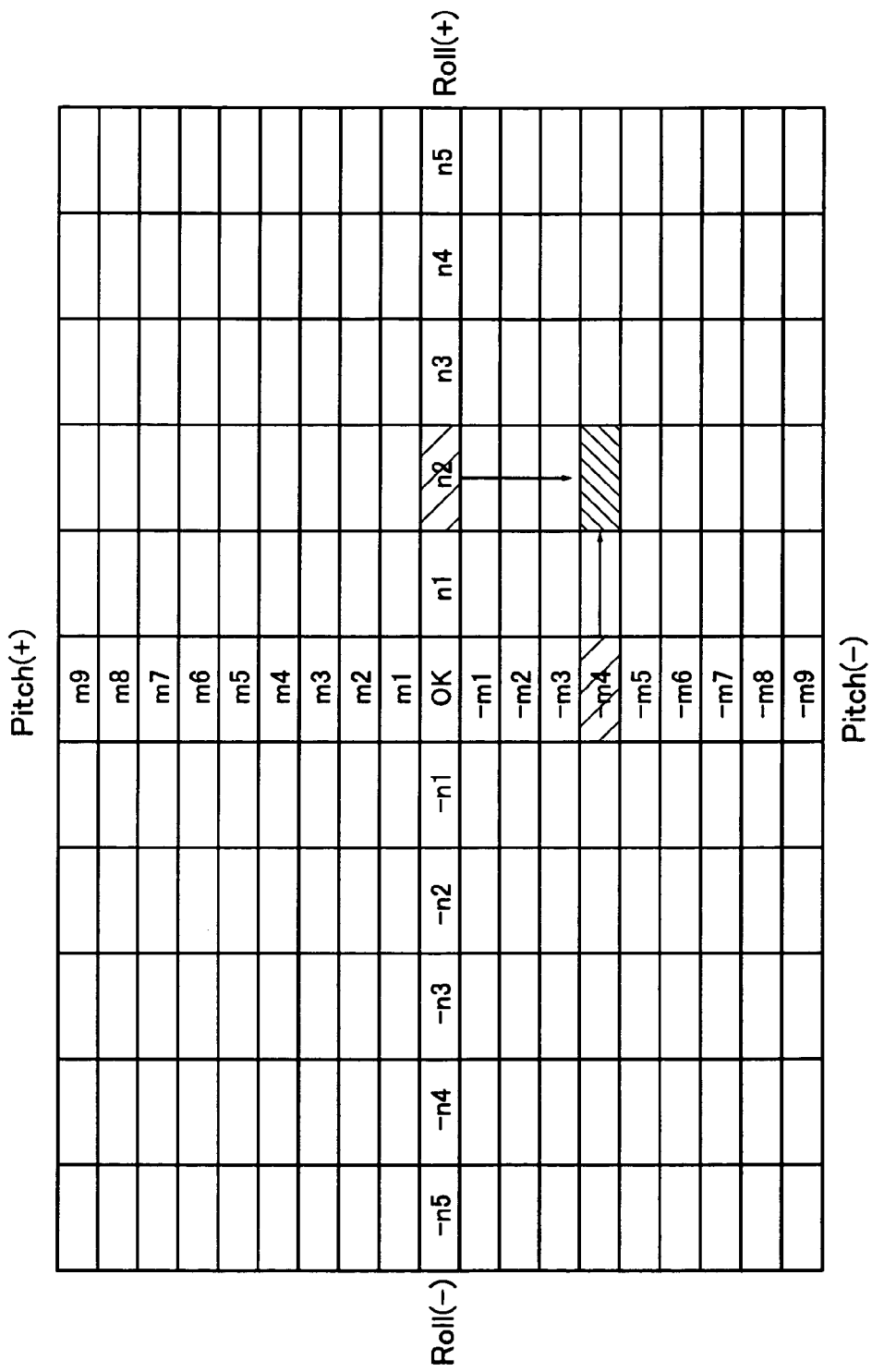
FIG. 5 is a diagram showing an idea of how adjustment conditions will be ranked corresponding to static attitude angles of a thin film magnetic head.

In order to enable such adjustment, the adjustment conditions corresponding to the static attitude angles of the thin film magnetic head are previously ranked and memorized in the memory unit 942. FIG. 5 is a diagram showing its idea, wherein adjustment conditions corresponding to measured pitch angles are ranked along the ordinate, e.g., positive ranks (m1 to m9) and negative ranks (−m1 to −m9); adjustment conditions corresponding to measured roll angles are ranked along the abscissa, e.g., positive ranks (n1 to n9) and negative ranks (−n1 to −n9). They are previously memorized in the memory unit 942. It will be appreciated that the number of ranks is arbitrary. When a signal for static attitude angles is supplied from the measuring unit 93, then, the CPU 941 retrieves from the memory unit 942 particular adjustment conditions corresponding to the measured angles and supplies the retrieved adjustment conditions to the adjusting unit 92.

In FIG. 5, for example, the positive rank (n2) and the negative rank (−m4) are retrieved from the memory unit 942, wherein the former is the adjustment condition corresponding to the measured roll angle and the latter is the adjustment condition corresponding to the measured pitch angle.

Based on the adjustment conditions supplied from the computer system 94, the adjusting unit 92 bends the flexure 12 supporting the thin film magnetic head 2. At this time, bending is performed to adjust the roll angle from the positive rank (n2) to the origin point OK and the pitch angle from the negative rank (−m4) to the origin point OK as seen in the diagram of FIG. 5. With such adjustment conditions supplied from the computer system 94 to the adjusting unit 92, the movement of the adjustment pins is controlled by the adjusting unit 92.

Figure 6:
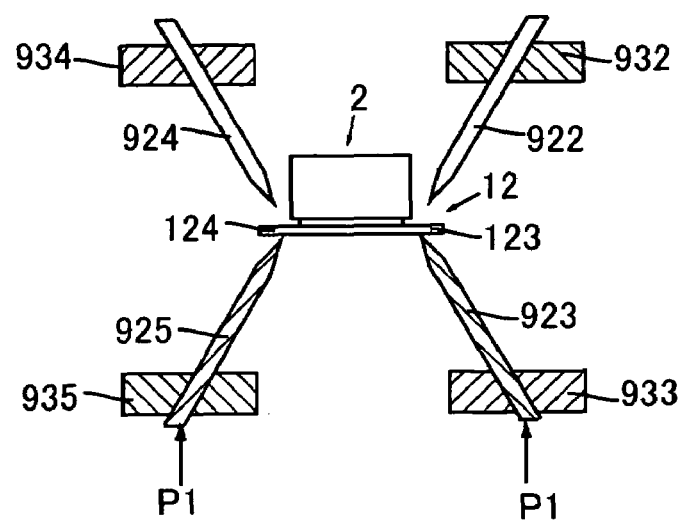
FIG. 6 is a diagram showing a pitch angle adjusting process by the adjusting unit shown in FIG. 3.
Figure 7:
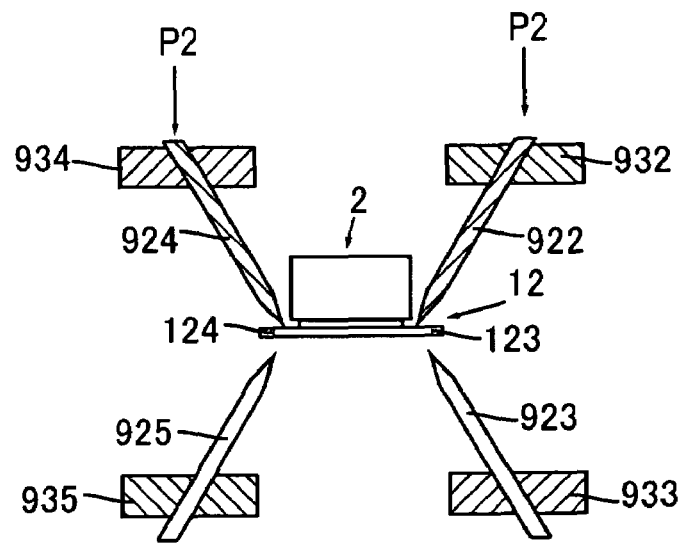
FIG. 7 is a diagram showing another pitch angle adjusting process by the adjusting unit shown in FIG. 3.

Next, processes of adjusting the static attitude angles with the use of the adjustment pins will be described in detail. FIGS. 6 and 7 are diagrams showing pitch angle adjusting processes by the adjusting unit shown in FIG. 3. First, as shown in FIG. 6, the adjustment pins 923, 925 are moved linearly in a direction P1 to press with their distal ends the longitudinal frame portions 123, 124 of the flexure 12 for pitch angle adjustment. This pitch angle adjusting direction P1 is taken as a positive direction.

FIG. 7 shows a case of adjusting the pitch angle in a negative direction P2, wherein the adjustment pins 922, 924 are moved linearly in the direction P2 to press with their distal ends the longitudinal frame portions 123, 124 of the flexure 12. Thus, the pitch angle can be adjusted in the negative direction P2.

Figure 8:
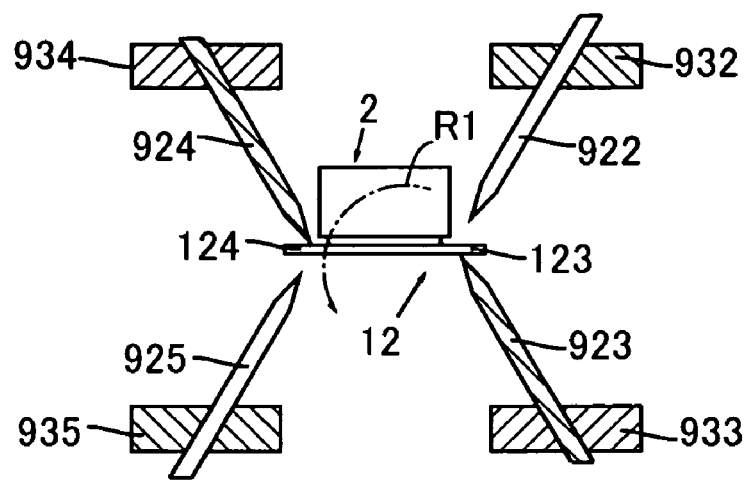
FIG. 8 is a diagram showing a roll angle adjusting process by the adjusting unit shown in FIG. 3.
Figure 9:
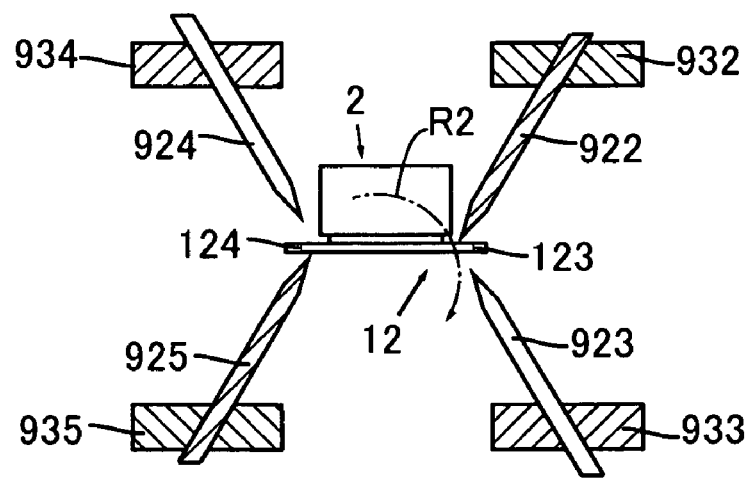
FIG. 9 is a diagram showing another roll angle adjusting process by the adjusting unit shown in FIG. 3.

FIGS. 8 and 9 are diagrams showing roll angle adjusting processes by the adjusting unit 92 shown in FIG. 3. First, as shown in FIG. 8, the adjustment pin 923 is moved linearly in the direction P1 to press with its distal end the longitudinal frame portion 123 of the flexure 12, and at the same time, the adjustment pin 924 is moved linearly in the direction P2 to press with its distal end the longitudinal frame portion 124 of the flexure 12. Thus, the roll angle can be adjusted in a direction R1. This roll angle adjusting direction R1 is taken as a positive direction.

FIG. 9 shows a case of adjusting the roll angle in a negative direction R2, wherein the adjustment pin 922 is moved linearly in the direction P2 to press with its distal end the longitudinal frame portion 123 of the flexure 12, and at the same time, the adjustment pin 925 is moved linearly in the direction P1 to press with its distal end the longitudinal frame portion 124 of the flexure 12. Thus, the roll angle can be adjusted in the negative direction R2.

Figure 10:
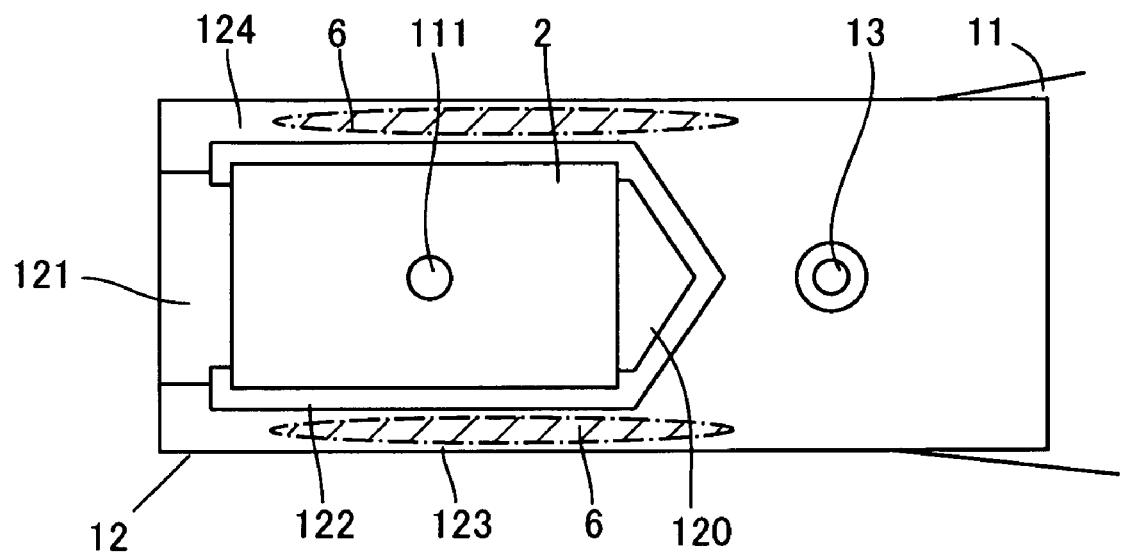
FIG. 10 shows laser irradiation positions on a flexure.

During the processes of adjusting the pitch angle and the roll angle shown in FIGS. 6 to 9, the laser beam LA is irradiated from the laser emitter unit 91 to one side of the flexure 12. More specifically, as shown in FIG. 10, the laser beam LA is irradiated to bent areas 6 of the flexure 12. The term "bent area" as used herein refers to an area where a flexure is bent for static attitude adjustment. The laser beam LA may be irradiated not to one point but to a plurality of points (e.g., 10 points) spaced apart over a distance. The laser beam LA may be irradiated to the other side of the flexure 12.

When the flexure 12 is mechanically bent in the processes illustrated in and described with reference to FIGS. 6 to 9, a stress corresponding to the bending is generated in the flexure 12. According to one embodiment of the present invention, since the laser beam LA is irradiated to the bent areas 6 of the flexure 12, the stress in the laser-irradiated areas 6 can be relieved by heat due to the irradiation of the laser beam LA. As a result, the restoring effect of the flexure 12 decreases in the laser-irradiated areas 6, keeping the flexure 12 bent at an angle close to the initial bending angle. This means that the flexure 12 can be kept at a desired bending angle even if the initial bending angle is small. If the areas 6 of the flexure 12 to be exposed to the laser beam LA are made of stainless steel, the laser beam LA is preferably irradiated to increase their surface temperature, for example, to 300 to 400° C. while blowing $N_2$ thereto.

The areas 6 of the flexure 12 to be exposed to the laser beam LA are areas exposed externally on both sides of the magnetic head 2 and/or between the magnetic head 2 and the joint 13 where the flexure 12 is secured to the load beam 11. Bending of the flexure 12 is performed at these areas. Accordingly, the initial bending angle of the flexure 12 can be directly reflected in the pitch angle of the magnetic head 2. Therefore, a significant change in pitch angle can be obtained from bending the flexure 12 at a small angle. The above static attitude adjusting apparatus, which provides a static attitude adjusting system mainly of the CPU 941, enables automatic adjustment of the static attitude of the thin film magnetic head with a high degree of reliability.

After adjusting the static attitude of the thin film magnetic head 2 as described above, the static attitude angles of the thin film magnetic head 2 are again detected by the measuring unit 93 to let the CPU 941 of the computer system 94 determine whether the detected static attitude angles fall within allowable angle ranges (which correspond to the origin point OK in FIG. 5). As a result of determination, if the detected static attitude angles do not fall within allowable angle ranges, the CPU 941 of the computer system 94 again supplies particular adjustment conditions to the adjusting unit 92. The adjusting unit 92 is operated to move the adjustment pins 922 to 925 based on the adjustment conditions supplied from the computer system 94, thereby bending the flexure 12. Then, the laser emitter unit 91 irradiates the laser beam LA to the bent areas of the flexure 12.

The above processes of detecting the static attitude angles, moving the adjustment pins, and irradiating the laser beam are repeated until the adjustment conditions for the roll and pitch angles come to the origin point OK shown in FIG. 5. When it is determined that the detected static attitude angles fall within allowable angle ranges (which correspond to the origin point OK in FIG. 5), then, the adjustment is completed. Subsequently, processing of a next workpiece (or another magnetic head unit 95) starts to execute the above processes. After completion of processing of all the set workpieces, the workpiece pallet is ejected, the operation is completed, and the workpiece pallet is taken out.

Figure 11:
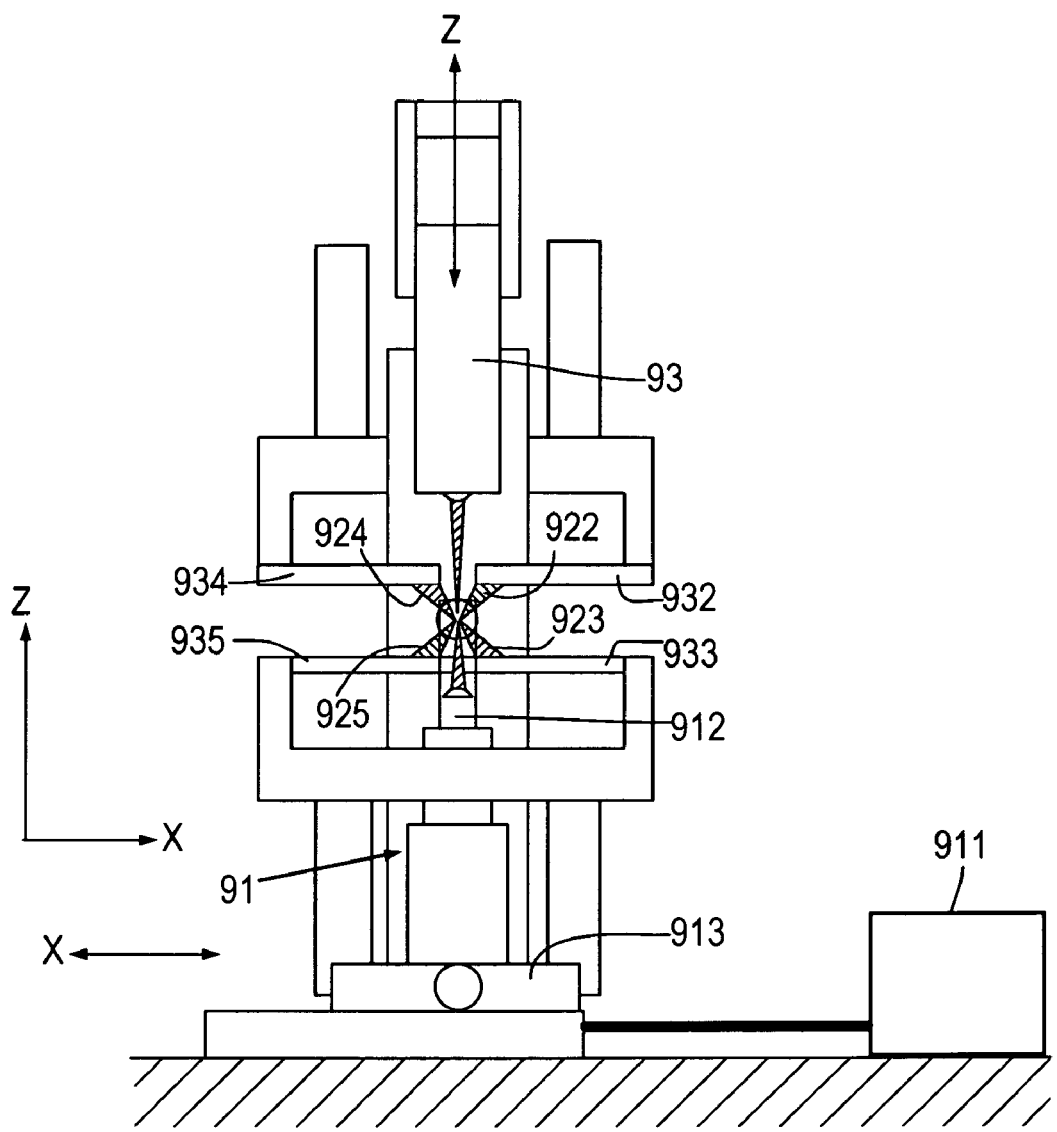
FIG. 11 is a front view showing a concrete structure of a static attitude adjusting apparatus according to one embodiment of the present invention.
Figure 12:
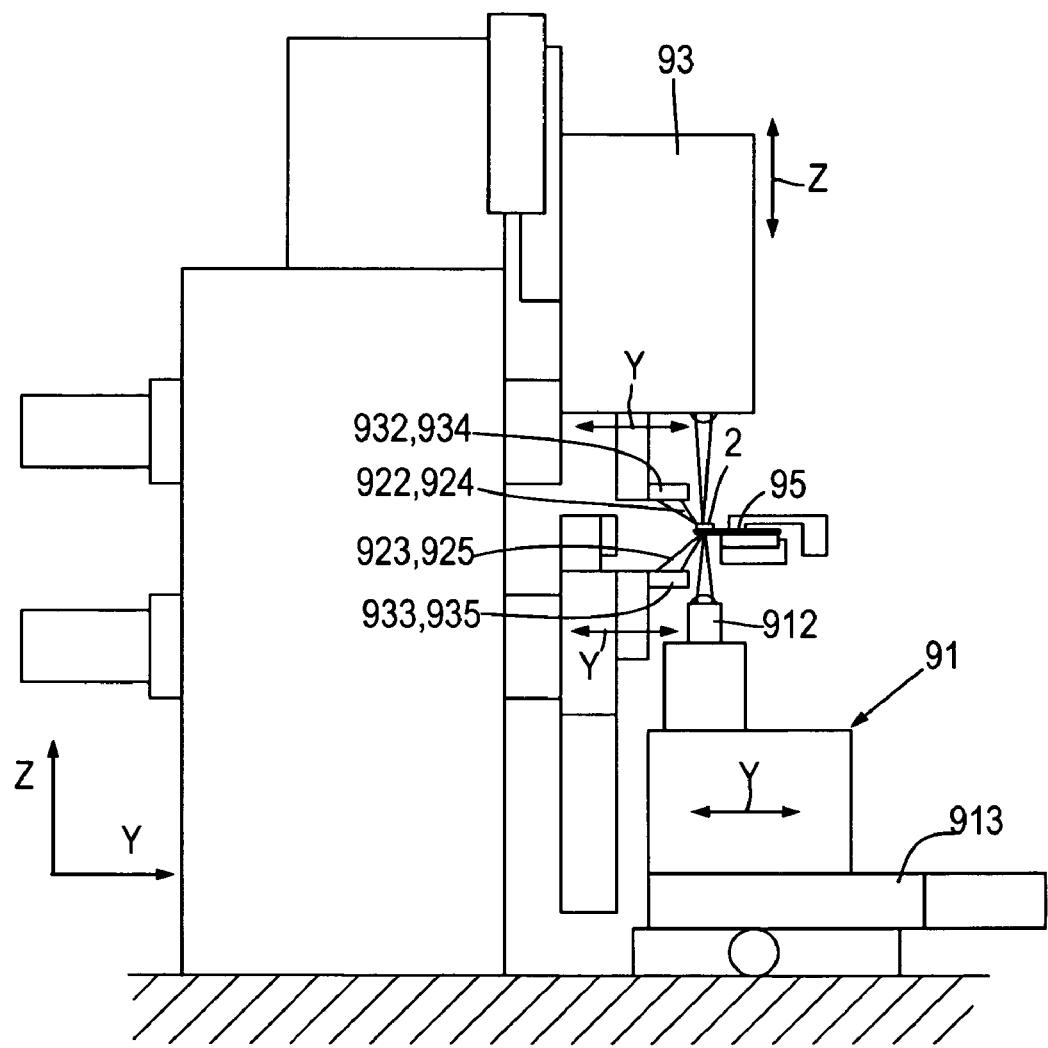
FIG. 12 is a side view of the static attitude adjusting apparatus shown in FIG. 11.

FIG. 11 is a front view showing a concrete structure of a static attitude adjusting apparatus according to one embodiment of the present invention, and FIG. 12 is a side view of the static attitude adjusting apparatus shown in FIG. 11. In these drawings, only the mechanical parts are illustrated and the portions corresponding to the components shown in the above drawings are designated by the same reference numerals.

The laser emitter unit 91 has three perpendicular axes X, Y and Z and is provided with an X-Y table 913 capable of moving along the X axis (or lateral direction) and the Y axis (or depth direction). The laser head 912 is disposed on the X-Y table 913. The laser head 912 is disposed to upwardly irradiate a laser beam. The laser oscillator 911 (see FIG. 11) may be disposed at any location.

The adjusting unit 92 includes the four adjustment pins 922 to 925 and the four driving units 932 to 935. These adjustment pins 922 to 925 are each disposed at an inclined position and driven to move along the Y axis and the Z axis by the driving units 932 to 935 while being kept at the inclined position.

The measuring unit 93 includes a laser autocollimator and is disposed opposite to the laser emitter unit 91. The measuring unit 93 is movable along the X, Y, Z axes and about the X, Y axes ($\theta X$, $\theta Y$) for position adjustment.

The magnetic head unit 95 being a workpiece is supported by the workpiece pallet 971, the holding jig 972 and the conveying jig 973 and fed to a position where the thin film magnetic head 2 can be pressed by the adjustment pins 922 to 925, exposed to the laser beam irradiated from the laser emitter unit 91, and measured for static attitude by the measuring unit 93.

The static attitude adjusting apparatus illustrated in FIGS. 11 and 12 can automatically execute the static attitude adjustment described with reference to FIGS. 1 to 10 with a high degree of efficiency.

While the present invention has been particularly shown and described with reference to embodiments thereof, it will be understood by those skilled in the art that various changes in form and detail may be made therein without departing from the spirit, scope and teaching of the invention. For example, the adjusting unit is not be limited to the type using pins but may be of the type of bending a flexure by clamping.

What is claimed is:

1. An apparatus for adjusting static attitude of a thin film magnetic head attached to a flexure of a head arm assembly, comprising:
    an adjusting unit for bending the flexure;
    a laser emitter unit for irradiating a laser beam to a bent area of the flexure;
    a measuring unit for measuring a static attitude angle of the thin film magnetic head; and
    a computer system including a CPU and a memory unit in which adjustment conditions corresponding to static attitude angles of the thin film magnetic head are previously ranked and memorized,
    wherein the CPU is configured to retrieve from the memory unit a particular adjustment condition corresponding to a measured angle supplied from the measuring unit and supply the retrieved adjustment condition to the adjusting unit, enabling the adjusting unit to bend the flexure based on the retrieved adjustment condition supplied from the computer system, the adjusting unit including at least four movable pins, wherein each of the four movable pins has a distal end positioned to be capable of contacting a surface of the flexure outside an area where the thin film magnetic head is attached and inclined to approach the thin film magnetic head as the distal end nears the flexure, at least two of the at least four movable pins are located on a first side of the flexure, and at least two of the at least four movable pins are located on a second side of the flexure, ranking is performed such that a plurality of adjustment conditions corresponding to measured pitch angles of the static attitude angles are ranked on both positive and negative sides with reference to an origin point, while a plurality of adjustment conditions corresponding to measured roll angles of the static attitude angles are ranked on both the positive and negative sides with reference to the origin point, and the adjusting unit selectively controls movement of the movable pins such that each rank supplied as the adjustment condition for the roll and pitch angles is returned to the origin point.

2. The apparatus for adjusting static attitude of claim 1, wherein the adjustment conditions include contact positions and thrust distances of the adjustment pins against the flexure and laser irradiation positions on the flexure.

3. The apparatus for adjusting static attitude of claim 2, wherein the adjustment conditions further include laser irradiation times.

4. The apparatus for adjusting static attitude of claim 2, wherein the measuring unit is a laser autocollimator.

5. The apparatus for adjusting static attitude of claim 1, wherein the measuring unit is a laser autocollimator.

* * * * *